June 29, 1965  M. MERZ  3,191,646
CHAIN SAW BAR
Original Filed July 2, 1959
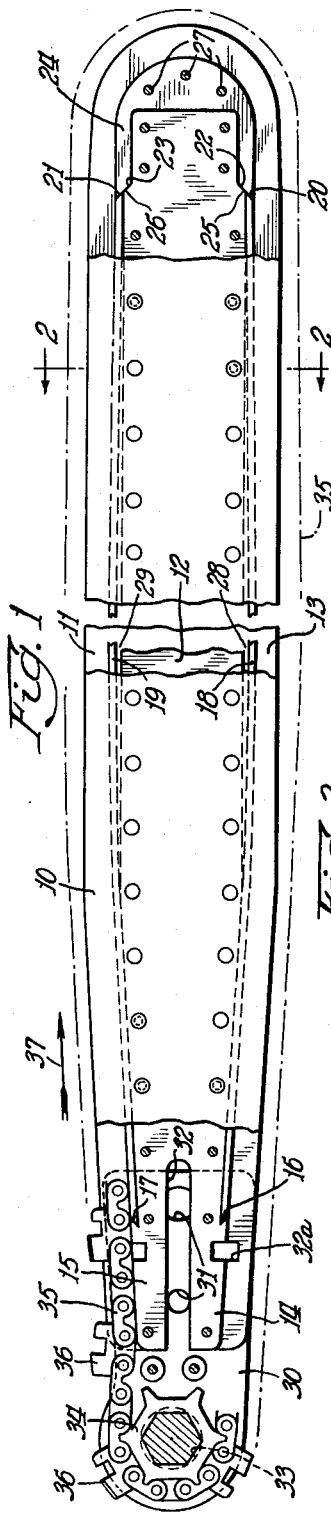
Inventor:
Max Merz
By: Frank R. Thienpont Atty.

United States Patent Office 3,191,646
Patented June 29, 1965

3,191,646
CHAIN SAW BAR
Max Merz, Los Angeles, Calif., assignor to Borg-Warner Corporation, Chicago, Ill., a corporation of Illinois
Continuation of application Ser. No. 824,647, July 2, 1959. This application June 1, 1962, Ser. No. 200,607
15 Claims. (Cl. 143—32)

The present invention relates generally to wood cutting chain saws and is more particularly concerned with improved guide bars for mounting the saw chains of such chain saw units.

This application is a continuation of application Serial No. 824,647, filed July 2, 1959 which has been abandoned.

Conventional wood cutting chain saw units comprise a driving engine, a saw chain mounting bar comprising an elongate flat metal member having a chain driving sprocket at the end of the bar adjacent the driving engine, and an idler chain sprocket at the remote end of the bar. A groove or channel around the periphery of the bar functions as a guide for the saw chain when the same is driven by the driving sprocket operably connected with the driving engine. The saw chain is a continuous chain disposed within said groove and passes around the driving and idler sprockets. Such conventional chain saw units utilize saw chain having the cutter links disposed quite some distance out of the chain saw bar guiding groove and, as a result, the chain saw unit sometimes does not function as satisfactorily as might be desired due to the tendency for the cutter links to wander in the kerf. Such wandering is caused by reason of the fact that there is no positive means for retaining the links in a relatively narrow path of travel.

One of the principal objects of the present invention is, therefore, to provide an improved chain saw guide bar wherein the saw chain cutter links are disposed with a major portion thereof within the guiding groove.

Further, conventional saw chain mounting bars are ordinarily formed of one piece of metal with a peripheral groove therearound, which peripheral groove is necessarily hardened in order to withstand the wear resulting from friction as the saw chain travels through the groove. In the present invention, the chain saw bar is provided with a removable wear resistant insert means which may be readily positioned within the peripheral saw chain guide bar groove in order to take the wear and when they become worn out, they may be replaced by new inserts, thereby obviating the necessity of scrapping the entire chain saw bar.

In connection with the foregoing feature of the present invention, it is an object to provide such insert means which may be inserted in the guide bar groove quite readily in the field so as to provide a bar which is capable of greater life and is consequently more economical to use.

A more detailed object of the present invention is to provide such wear resistant inserts of a material, such as spring steel, so that the inserts may be slightly resilient and thereby be permitted to take up any slack which may exist in the chain. It has been found that with this construction the ordinary whipping or jumping of the saw chain in the groove is substantially minimized. In accomplishing this desirable result, the chain saw bar is formed with substantially parallel edges in the middle portion thereof, with either end tapering slightly toward the end of the bar, thus when the spring steel inserts are placed within the elongate portions of the peripheral groove around the bar they must bend slightly in the medial regions thereof. This causes the inserts to be slightly displaced from the bottom of the groove in the bar and permits the inserts to yield slightly when the saw chain is placed in cutting position against a log or is placed under tension.

A further advantage of the chain saw bar comprising the subject matter of the present invention resides in the fact that the bar is laminated, that is, it is formed of at least three laminations, the outer ones of which are somewhat wider and somewhat longer than the inner laminations in order to provide the peripheral saw chain guiding groove around the bar. The middle lamination may be formed of some light weight material, such as aluminum or magnesium or even plastic, for example, whereas the outer laminations will probably be formed of some form of wear resistant material such as steel. The three laminations are then secured together by any well-known means, such as by riveting preferably. The resultant chain saw bar is thereby quite rigid but much lighter than would be the case were the bar made of one single piece of material as is the case with conventional chain saw bars.

Another object of this invention is to provide the chain saw guide bar with an easily replaceable wear resistant nose piece fitted onto the inner lamination to absorb wear on the chain saw guide bar at that point.

With respect to the last mentioned object it is a further object to provide a wear resistant nose piece of the snap-in type which is held in place by a force fit between the two outer laminations of the chain saw guide bar.

The foregoing and other objects and advantages of the present invention will be apparent from the following detailed description, when read in conjunction with the acompanying drawings, wherein:

FIG. 1 represents a plan view which has been partially cut away to illustrate certain details of a chain saw bar constructed in accordance with the principles of the present invention;

FIG. 2 comprises a sectional view taken substantially along the line 2—2 in FIG. 1 and looking in the direction of the arrows;

FIG. 3 is a plan view of one of the outer laminations of which the chain saw bar of FIG. 1 is made;

FIG. 4 is a plan view of the inner lamination of which the chain saw bar of FIG. 1 is made;

FIG. 5 is a detail view of the end U-shaped insert for use in the chain saw bar;

FIG. 6 is a detail view of the end U-shaped snap-on insert for use in the chain saw bar;

FIG. 7 is a partial plan view of cut away to illustrate the snap-on insert in place; and FIG. 8 is a sectional view along the line 8—8 of FIG. 7.

With reference now to the drawings, wherein like reference numerals have been used in the different views to identify identical parts, the chain saw bar comprising the subject matter of the present invention consists of a pair of outer laminations 10 and 11 and an inner lamination 12. The outer laminations 10 and 11 are slightly longer and slightly wider than the inner lamination 12 and this differential in the sizes of the laminations of which the bar is composed provides a peripheral groove 13 which extends around the elongate edges and the nose end of the bar.

The outer laminations 10 and 11 are preferably formed of some substantially wear resistant material, such as steel, whereas the inner lamination 12 may be preferably formed of some lighter material, such as aluminum, magnesium or even a plastic, for example. It is not intended that these examples of the materials of which the laminations 10, 11 and 12 are formed are in any way exhaustive but are merely illustrative of the material of which they could be formed. It will suffice to say that by forming the inner lamination 12 of some lighter weight material the overall weight of the chain saw bar and chain saw unit itself is substantially decreased relative to the weight of a conventional saw chain bar of corresponding size.

The laminations 10, 11 and 12 may be secured together by any well-known means, however, it is contemplated herein that they will preferably be secured together by a plurality of rivets which pass through suitable aligned holes formed in each of the laminations (see particularly FIGS. 3 and 4).

The inner lamination 12, as well as the two other laminations 10 and 11 have substantially parallel edges in their medial regions, however, the end portions of each of the laminations are tapered slightly so that the bar actually tapers somewhat toward either end thereof. The inner lamination 12 is formed with a pair of outwardly extending opposed projections 14 and 15 adjacent the one end of the bar and said projections 14 and 15 respectively terminate in an angular dovetail-like retainer surface or locking surface 16 and 17 respectively.

A pair of elongate inserts 18 and 19 of a length sufficient to reach respectively from angularly disposed abutment surfaces 16 and 17 to a point such that their opposed ends 20 and 21 are aligned with angular surfaces 22 and 23 formed on the opposed sides of inner lamination 12.

A substantially U-shaped wear resistant nose piece or insert 24 is provided with leading beveled ends 25 and 26 which are respectively complementary to beveled surfaces 20 and 22 and beveled surfaces 23 and 21 and when the nose piece or nose insert means 24 is disposed in the position, as shown in FIG. 1, it is effective to retain the elongate inserts 18 and 19 in position in the peripheral groove around the chain saw bar inasmuch as the opposite ends of the elongate inserts 18 and 19 are held in place by the abutment or retainer surfaces 16 and 17.

Preferably, the chain saw bar outer laminations 10 and 11 are formed with suitable holes through which rivets may extend and which rivets pass through suitable openings 27 in the insert nose piece 24. By providing the rivets in the openings 27 this holds the laminations 10 and 11 together at the nose end of the bar which is important during certain operations such as "boring."

It will be noted that the projections 14 and 15 are of substantially the same thickness as the thickness of the wear resistant inserts 18 and 19. Inasmuch as the inner lamination 12 of the bar tapers slightly toward either end, there is a slight amount of space, designated by reference numerals 28 and 29, between the inserts 18 and 19 and the inner lamination 12 in the medial portion of the chain saw bar. This space affords a certain amount of resiliency for the inserts.

A driving sprocket mounting member 30 formed with a pair of holes 31 therein, is adapted to be disposed at the end of the bar opposite the end formed with the nose piece 24. Suitable mounting bolts may be disposed within openings 31 and these bolts extend into a slot 32 formed in the end of inner lamination 12 in order to facilitate adjustably positioning the sprocket mounting plate 30 relative to the chain saw bar. As shown in FIG. 1, the sprocket mounting plate is provided with a suitable opening 33 and within the projecting end of the mounting plate 30 a sprocket 34 is positioned for rotation. In laterally spaced relation relative to the slot 32 are a pair of openings 32a in laminations 10 and 11, which facilitate adjustment of the bar with respect to the driving unit with which it will be associated.

A chain 35 formed with a plurality of cutter elements 36 is disposed in the groove around the periphery of the bar and passes over the driving sprocket 34. A driving engine (not shown) may be provided for driving sprocket 34 and thus, in turn, driving chain 35 in the direction of the arrow 37. The peripheral speed of the chain 35 is substantial and it has been found that when the links are carried around sprocket 34 there is a tendency for them to follow the sprocket 34 as they leave the sprocket. Thus, it has been found that it is advantageous to provide the elongate projections 14 and 15 of the relatively soft material of which the inner lamination 12 is made so that the chain may strike one of said projections (depending upon the direction of travel of the chain) and erode or wear them away to the necessary contour without causing excessive wear of the driving portions of the chain links. By the time that the chain has reached the locking surfaces 16 or 17, depending upon the direction of rotation of the sprocket, it will be riding within the groove on top of the inserts 19 and 18, but the friction between the chain and the inserts 19 and 18 will be a sliding friction and will not be such as would occur at the end of the bar adjacent the sprocket where the teeth tend to strike the shoulders 14 or 15 with an impact.

When the chain 35 is disposed around the bar and the driving engine drives the sprocket 34 and chain 35, the spring steel inserts 18 and 19 are somewhat resilient in their medial portions, as provided by the spaces 28 and 29. This causes the chain to run very smoothly as the resiliency takes up any slack and prevents whipping of the chain which normally occurs when it travels along a substantially straight narrow bar. When the chain saw bar is moved into cutting position with the chain 35 resting on a log or against a log, the spaces 28 or 29 afford a certain amount of resiliency for the chain and thus make for substantially improved operation.

An alternative form of a wear resistant nose piece is the substantially U-shaped snap-in insert 24a shown in FIG. 6. This snap-in insert is provided with leading ends 25a and 26a which are respectively complementary to surfaces 20 and 22 and surfaces 21 and 23 when the nose piece or insert means 24a is disposed as shown in FIG. 7.

The snap-in insert 24a is made slightly thicker than the space between the outer laminations 10 and 11, approximately .140 inch, for example, if the space between laminations 10 and 11 is .135 inch. The insert 24a is formed with two slots 39 and 40 adapted to engage respectively bushings 43 and 44 which are held in place by pins 41 and 42 connecting and extending between the laminations 10 and 11 as shown in FIGS. 7 and 8. The insert 24a may be snapped in place.

This snap-in insert type of nose piece has been found particularly advantageous because it can be easily removed without any special tools. A hook type tool engageable over the ends 25a and 26a is the most convenient type of tool to use to dislodge the insert 24a from between the laminations 10 and 11. However, in lieu of such a tool a screw driver, for example, may be applied to either of the ends 25a or 26a to dislodge the insert 24a.

Due to the relatively deep groove in which the chain travels, it is a relatively easy matter to maintain proper lubrication of the chain.

Among the changes which are contemplated to be within the scope of the present invention is the fact that the U-shaped insert 24 could be somewhat narrower right at the nose of the bar with the rivets at the nose passing through the inner lamination of which the bar is composed with the insert 24 being disposed completely on the outside of the inner lamination 12. This would in no way hinder the operation of the bar for normal usage as the chain will readily retain the insert 24 in position.

The principal advantages of the present invention stem from the fact that the chain is more accurately guided than is the case in conventional chain saw structures, by providing the chain disposed deep within the peripheral groove it is an easy matter to maintain lubrication of the chain relative to the bar and to maintain lubrication between the adjacent links, and the entire unit is lighter because of the lighter inner lamination.

It is contemplated that other changes and modifications may be made in the present invention without departing from the spirit or scope thereof.

What is claimed is:

1. A generally elongate chain saw guide bar for a chain saw chain comprising a plurality of laminations disposed with the adjacent flat surfaces thereof secured together, the outer of said laminations being longer and wider than the inner of said laminations and thereby providing a saw chain guiding groove extending around the elongate edges and around one end of the guide bar, the inner of said laminations being relatively soft and including means defining retainer devices adjacent the other end of the guide bar and on its opposed elongate edges, relatively hard wear resistant insert means comprising a pair of elongate members respectively disposed within the groove along the elongate edges of said bar and a generally U-shaped nose piece disposed within the groove around said one end of the guide bar, and one end of each of said elongate members being respectively held in place in said groove by said retainer devices and the ends of said nose piece respectively engaging the other end of each of said elongate members for thereby holding the same in place, whereby a saw chain disposed within said groove rides over the elongate insert members and the U-shaped nose piece and is effective to hold the latter in position within the groove during operation of the chain saw.

2. In combination, a generally elongate chain saw guide bar for a chain saw chain, said guide bar comprising a plurality of laminations disposed with the adjacent flat surfaces thereof secured together, the outer of said laminations being longer and wider than the inner of said laminations and thereby providing a saw chain guiding groove extending around the elongate edges and around one end of the guide bar, the inner of said laminations being relatively soft and including means defining retainer devices adjacent the other end of the guide bar and upon its opposed elongate edges, relatively hard wear resistant insert means comprising a pair of elongate members respectively disposed within the groove along the elongate edges of said bar and a generally U-shaped nose piece disposed within the groove around said one end of the guide bar, one end of each of said elongate members being respectively held in place in said groove by said retainer devices and the ends of said nose piece respectively engaging the other end of each of said elongate members for thereby holding the same in place, means mounting a driving sprocket adjacent said other end of said guide bar, and a saw chain disposed within said groove so as to be driven by said driving sprocket, whereby said chain rides over said wear resistant insert means when driven by said sprocket, the chain, as it leaves the sprocket upon being driven thereby, being adapted to impinge against one of said retainer devices on said inner lamination and the latter eroding due to the action of the chain thereagainst and thus causing substantially no wear on the chain.

3. A chain saw guide bar for a chain saw chain comprising an elongated relatively flat member having a peripheral groove around the opposed elongate edges and one end thereof, a pair of elongated spring steel wear resistant inserts respectively disposed within the groove along the opposed elongate edges of said bar, a generally U-shaped wear resistant insert disposed within said groove around said one end including beveled ends cooperable with adjacent complementary beveled ends on said pair of elongated inserts for holding the latter in position within said groove, and said elongated inserts being bowed slightly outwardly in the medial portions thereof relative to the configuration of the elongate edges of said bar, whereby a saw chain disposed within the groove rides over said inserts and the bow of the elongated inserts is effective to take up slack in the chain by providing a slightly curved surface over which the chain runs.

4. A chain saw guide bar for chain saw chain comprising a plurality of elongated laminations disposed with the adjacent flat surfaces thereof secured together, the outer of said laminations being larger than the inner of the laminations and thereby providing a peripheral groove around the elongate edges and around one end of said bar, a pair of relatively hard elongate wear resistant spring steel inserts respectively disposed within the groove along the opposed elongate edges of said bar, said elongate inserts being beveled at their opposed ends and one end of each elongate insert being seated beneath a complementary beveled retaining surface formed on opposed projections on said inner of said laminations for retaining the one end of each elongate insert in place in said groove, a generally U-shaped wear resistant insert disposed within said groove around said one end of said bar and having beveled ends cooperable with the adjacent complementary beveled ends on said pair of elongated inserts for holding the latter in position within said groove, said wear resistant inserts functioning to resist wear from a saw chain disposed within said groove as the chain rides over the inserts during operation of the chain saw.

5. A chain saw guide bar for chain saw chain comprising a plurality of elongate laminations disposed with the adjacent flat surfaces thereof secured together, the outer of said laminations being larger than the inner of the laminations and thereby providing a peripheral groove around the elongate edges and around one end of said bar, a pair of relatively hard elongate wear resistant spring steel inserts respectively disposed within the groove along the opposed, elongate edges of said bar, said elongate inserts being beveled at their opposed ends and one end of each elongate insert being seated beneath a complementary beveled retaining surface formed on opposed projections on said inner of said laminations for retaining the one end of each elongate insert in place in said groove, a generally U-shaped wear resistant insert disposed within said groove around said one end of said bar and having beveled ends cooperable with the adjacent complementary beveled ends on said pair of elongated inserts for holding the latter in position within said groove, and said elongated inserts being bowed outwardly slightly in the middle portions thereof relative to the configuration of the elongate edges of said bar, whereby a saw chain disposed within the groove rides over said inserts and the bow of the inserts is effective to take up slack in the chain by providing a slightly curved surface over which the chain runs.

6. A chain saw guide bar for a chain saw chain comprising a plurality of laminations disposed with the adjacent flat surfaces thereof securely riveted together, the outer of said laminations being larger than the inner thereof and thereby providing a groove extending around the opposed longitudinal edges and around one end of the bar, a pair of elongated inserts disposed within said groove along the longitudial edges of said bar, a generally U-shaped locking insert disposed within the groove at said one end of the bar and adapted to retain the ends of said elongated inserts in place within said groove, means defining retainer surfaces on said inner lamination and on said U-shaped insert for retaining said elongated inserts in place, and rivet means extending through said outer laminations and through said U-shaped locking insert for retaining the latter in said groove and preventing said outer laminations from spreading apart during operation of the chain saw as a saw chain rides in said groove over said inserts.

7. A chain saw guide bar for a chain saw chain comprising a plurality of laminations disposed with the adjacent flat surfaces thereof secured together, the outer of said laminations being larger than the inner thereof and thereby providing a groove extending around the opposed longitudinal edges and around one end of the bar, a generally U-shaped wear resistant insert disposed within the groove between the outer laminations at said one end of the bar, means defining at least one open end slot in said insert, pin means positioned between said outer laminations to coact with said slot means for positioning said insert within said groove, the groove extending around said one end of the bar defining a space relatively narrower than the thickness of said insert so that said insert is positioned tightly in said groove, said U-shaped insert being removable by sliding from between said outer laminations and from around said pin means.

8. A chain saw guide bar for a chain saw chain comprising a plurality of laminations disposed with the adjacent flat surfaces thereof securely riveted together, the outer of said laminations being larger than the inner thereof and thereby providing a groove extending around the opposed longitudinal edges and around one end of the bar, a pair of elongated arcuate inserts disposed within said groove along the longitudinal edges of said bar in arched relation to the edge of the inner lamination, a generally U-shaped locking insert disposed within the groove at said one end of the bar and adapted to retain the ends of said elongated inserts in place within said groove, means defining retainer surfaces on said inner lamination and on said U-shaped insert for retaining said elongated inserts in place, and rivet means extending through said outer lamination and through said U-shaped locking insert for retaining the latter in said groove and preventing said outer laminations from spreading apart during operation of the chain saw as a saw chain rides in said groove over said inserts.

9. A chain saw guide bar for a chain saw chain comprising a plurality of laminations disposed with the adjacent flat surfaces thereof secured together, the outer of said laminations being larger than the inner thereof and thereby providing a groove extending around the opposed longitudinal edges and around one end of the bar, a generally U-shaped wear resistant insert slidably inserted within the groove between the outer laminations at said one end of the bar, the groove extending around said one end of the bar defining a space relatively narrower than the thickness of said insert before the insert is placed in position so that said insert is wedgingly positioned in said groove in the final assembly of the bar, and a pair of elongated arcuate inserts respectively disposed within said groove along the longitudinal edges of said bar, one end of each of said arcuate inserts being secured to said inner lamination and the remaining end of each of said arcuate inserts being in engagement with the U-shaped locking insert, whereby a saw chain disposed within said groove rides over said U-shaped inserts and the outer surface of said elongated arcuate inserts and is effective together with said arcuate inserts to take up slack in the chain by providing a slightly resilient surface over which the chain runs.

10. A chain saw guide bar for a chain saw chain comprising a plurality of laminations disposed with the adjacent flat surfaces thereof secured together, the outer of said laminations being larger than the inner thereof and thereby providing a groove extending around the opposed longitudinal edges and around one end of the bar, a generally U-shaped wear resistant insert slidably inserted within the groove between the outer laminations at said one end of the bar, the groove extending around said one end of the bar defining a space relatively narrower than the thickness of said insert before the insert is placed in position so that said insert is wedingly positioned in said groove in the final assembly of the bar, a pair of elongated inserts disposed within said groove along the longitudinal edges of said bar, each of said elongated inserts having one end secured to said inner lamination and the other end in engagement with the U-shaped wear resistant insert, said U-shaped piece being effective to hold the elongated inserts in position in the groove during operation of the chain saw.

11. A chain saw guide bar for a chain saw chain comprising a plurality of laminations disposed with the adjacent flat surfaces thereof secured together, the outer of said laminations being larger than the inner thereof and thereby providing a groove extending around the opposed longitudinal edges and around one end of the bar, a generally U-shaped wear resistant insert disposed within the groove between the outer laminations at said one end of the bar, means defining at least one open end slot in said insert, pin means positioned between said outer laminations to coact with said slot means for positioning said insert within said groove, the groove extending around said one end of the bar defining a space relatively narrower than the thickness of said insert so that said insert is positioned tightly in said groove, said U-shaped insert being removable by sliding from between said outer laminations and from around said pin means, and an arcuate spring insert disposed in arched relation to the longitudinal edge of the inner lamination within said peripheral groove in supporting engagement with the chain, said insert having bevelled ends in engagement with the inner lamination and the U-shaped wear resistant insert for retaining said spring insert in arched position.

12. A chain saw bar for a chain saw comprising a guide bar having a groove formed in the periphery thereof for receiving a saw chain to guide the chain around the bar, and arcuate resilient inserts extending along a major portion of the length of said bar and positioned within the groove in arched relation with the bottom of the groove, said inserts having bevelled end surfaces in planes which intersect on the arched side of the respective inserts, said guide bar having shoulders formed thereon in the bottom of the groove, said shoulders being in respective complementary engagement with the bevelled ends of said inserts for slidably engaging the ends of said resilient inserts to retain said inserts in position on the bottom of the groove, whereby said inserts are free to flex in the groove to resiliently support a chain in the groove.

13. A chain saw bar for a chain saw chain comprising a guide bar having a groove formed in the periphery thereof for receiving a saw chain to guide the chain around the bar, a wear resistant insert positioned within a portion of the groove for supporting the chain, said bar having the groove thereof formed to define a space in the insert retaining portion thereof which is relatively narrower than the thickness of said insert before the insert is placed in position so that said insert is wedgingly positioned in said groove, arcuate resilient inserts positioned within the groove in arched relation with the bottom of the groove, shoulders formed on said guide bar in the bottom of the groove for retaining one end of each resilient insert for retaining the end of each of said resilient inserts, shoulders formed on said wear resistant insert in engagement with the remaining ends of said resilient inserts to act in cooperation with said guide bar shoulders for retaining the ends of said resilient inserts to position said resilient inserts on the bottom of the groove whereby said resilient inserts are effective for resiliently supporting a chain moving within the groove.

14. A chain saw bar for a chain saw chain comprising a guide bar having a groove formed in the periphery thereof for receiving a saw chain to guide the chain around the bar, and a wear resistant insert positioned within a portion of the groove for supporting the chain, said bar having the groove thereof formed to define a space in the insert retaining portion thereof which is relatively narrower than the thickness of said insert before said insert is placed in position so that said insert is wedgingly positioned in said groove, and arcuate resilient inserts positioned within the groove in arched relation with the bottom of the groove, said resilient inserts having bevelled end surfaces in planes which intersect on the arched side of the respective inserts, said guide bar having shoulders formed thereon in the bottom of the groove, said shoulders being in respective complementary sliding engagement with one bevelled end of each of said inserts for retaining one end of each of said resilient inserts in position on the bottom of the groove, said wear resistant insert having shoulders formed thereon in respective complementary sliding engagement with the remaining bevelled ends of said resilient inserts for slidably retaining the remaining end of said inserts in position on the bottom of the groove whereby said resilient inserts are free to flex in the groove against the shoulders formed on the bar and on the wear resistant insert to resiliently support a chain in the groove.

15. A chain saw bar for a chain saw chain comprising an elongated bar having grooves formed in the sides thereof and a deeper groove formed in one end thereof to form a continuous groove having resilient sides in the end portion of the bar and adapted to receive a saw chain to guide the chain along the bar, and a wear resistant insert substantially conforming to the shape of the groove in the end of the bar and adapted to be positioned within the deep groove in the end of the bar for supporting and guiding the chain around the end of the bar, said insert being slightly wider than the groove in the end of the bar before said insert is positioned therein whereby said insert will be retained in the deep groove in the end of the bar by the resilient sides of the groove, said bar having the bottom of the groove portion in the end thereof in complementary keying engagement with the insert to tend to prevent movement of said insert along said groove.

References Cited by the Examiner

UNITED STATES PATENTS

| | | |
|---|---|---|
| 2,719,761 | 10/55 | Bonnafe. |
| 2,888,964 | 6/59 | Mall. |
| 2,897,856 | 8/59 | Carlton. |
| 2,964,073 | 12/60 | Gudmundsen. |

FOREIGN PATENTS

| | | |
|---|---|---|
| 812,471 | 8/51 | Germany. |
| 578,826 | 7/46 | Great Britain. |

WILLIAM W. DYER, Jr., *Primary Examiner.*

DONALD R. SCHRAN, *Examiner.*